United States Patent
Stephenson et al.

(10) Patent No.: US 10,620,814 B2
(45) Date of Patent: Apr. 14, 2020

(54) CROSS SLIDE GESTURE

(71) Applicant: MICROSOFT TECHNOLOGY LICENSING, LLC, Redmond, WA (US)

(72) Inventors: Alan Stephenson, Redmond, WA (US); Brian Wheeler, Bothell, WA (US); Joyce Wu, Redmond, WA (US); Pamela De la Torre Baltierra, Carnation, WA (US); Reed Townsend, Kirkland, WA (US); Uros Batricevic, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 420 days.

(21) Appl. No.: 15/146,198

(22) Filed: May 4, 2016

(65) Prior Publication Data
US 2016/0246471 A1    Aug. 25, 2016

Related U.S. Application Data

(63) Continuation of application No. 13/674,238, filed on Nov. 12, 2012, now Pat. No. 9,335,913.

(51) Int. Cl.
*G06F 3/0485* (2013.01)
*G06F 3/0482* (2013.01)
(Continued)

(52) U.S. Cl.
CPC .......... *G06F 3/0485* (2013.01); *G06F 3/0482* (2013.01); *G06F 3/0486* (2013.01);
(Continued)

(58) Field of Classification Search
CPC .. G06F 3/0486; G06F 3/0485; G06F 3/04817; G06F 3/0482; G06F 3/04842; G06F 3/04845; G06F 3/04883
(Continued)

(56) References Cited

U.S. PATENT DOCUMENTS 6,559,873 B1 *   5/2003   Dawkins ............ G06F 3/04812
                                                            715/856
7,932,896 B2     4/2011   Westerman
(Continued)

FOREIGN PATENT DOCUMENTS

CN       101742104 A      6/2010
CN       102099776 A      6/2011
(Continued)

OTHER PUBLICATIONS

"Guidelines for cross-slide". Windows Dev Center [online]. [retrieved on Oct. 12, 2018]. Retrieved from the Internet (URL: https://web.archive.org/web/20120104015636/http://msdn.microsoft.com/en-us/library/windows/apps/hh465299(v=VS.85).aspx), Sep. 7, 2011 (Year: 2011).*
(Continued)

*Primary Examiner* — Daniel Samwel (57) ABSTRACT

Techniques relating to scrolling, object selection, and object moving are discussed. Strokes are inputted by a user, for instance using a touch sensitive surface. Strokes are directed to a scrollable surface with objects therein. Strokes that end before meeting a condition select the objects, and strokes then end after meeting the condition move the objects or representations thereof. The condition may be a distance. Selection may only occur when strokes meet a threshold condition such as having a particular direction (e.g., perpendicular to a direction for scrolling the surface) or moving a minimal distance. Strokes in a scrolling direction (e.g., horizontal) may scroll the surface in that direction and
(Continued)

strokes in another direction (e.g., vertical) may both select and move the objects. Objects selected may slide on rails before moving.

20 Claims, 9 Drawing Sheets (51) Int. Cl.
G06F 3/0486 (2013.01)
G06F 3/0488 (2013.01)
G06F 3/0484 (2013.01)
G06F 3/0481 (2013.01)

(52) U.S. Cl.
CPC ...... *G06F 3/04817* (2013.01); *G06F 3/04842* (2013.01); *G06F 3/04845* (2013.01); *G06F 3/04883* (2013.01)

(58) Field of Classification Search
USPC .................................................. 715/700–866
See application file for complete search history.

(56) References Cited

U.S. PATENT DOCUMENTS

| | | | |
|---|---|---|---|
| 8,469,810 | B2 | 6/2013 | Nakanishi et al. |
| 2002/0056575 | A1 | 5/2002 | Keely et al. |
| 2006/0012572 | A1* | 1/2006 | Sakurai ................. G06F 3/0482 345/157 |
| 2008/0168364 | A1* | 7/2008 | Miller ...................... G06F 3/016 715/762 |
| 2009/0015550 | A1* | 1/2009 | Koski ................. G06F 3/04812 345/157 |
| 2009/0271723 | A1 | 10/2009 | Matsushima et al. |
| 2009/0292989 | A1 | 11/2009 | Matthews et al. |
| 2009/0293007 | A1 | 11/2009 | Duarte et al. |
| 2009/0313567 | A1 | 12/2009 | Kwon et al. |
| 2010/0017732 | A1 | 1/2010 | Matsushima et al. |
| 2010/0141589 | A1 | 6/2010 | Hoover |
| 2010/0185681 | A1 | 7/2010 | Han et al. |
| 2010/0289740 | A1 | 11/2010 | Kim et al. |
| 2010/0315366 | A1* | 12/2010 | Lee ....................... G06F 3/0486 345/173 |
| 2012/0131488 | A1 | 5/2012 | Karlsson et al. |
| 2012/0133680 | A1 | 5/2012 | Hoover et al. |

FOREIGN PATENT DOCUMENTS

| | | | |
|---|---|---|---|
| CN | 102520851 | A | 6/2012 |
| EP | 2112594 | A2 | 10/2009 |
| WO | 2009142871 | A2 | 11/2009 |
| WO | 2013019404 | A1 | 2/2013 |

OTHER PUBLICATIONS

"Responding to touch input". Windows Dev Center [online]. [retrieved on Oct. 12, 2018]. Retrieved from the Internet (URL: https://web.archive.org/web/20120104015636/http://msdn.microsoft.com/en-us/library/windows/apps/hh465299(v=VS.85).aspx), Sep. 7, 2011 (Year: 2011).*
"Designing Metro style apps", Windows Dev Center [online]. [retrieved on May 7, 2019]. Retrieved from the Internet (URL: https://web.archive.org/web/20110924070602/http://msdn.microsoft.com/en-us/library/windows/apps/hh465427(v=VS.85).aspx), Sep. 15, 2011 (Year: 2011).*
"Responding to user input (JavaScript)", Windows Dev Center [online]. [retrieved on May 7, 2019]. Retrieved from the Internet (URL: https://web.archive.org/web/20110924063844/http://msdn.microsoft.com/en-us/library/windows/apps/br211372(v=VS.85).aspx), Sep. 24, 2011 (Year: 2011).*
"Wayback Machine Error", Wayback Machine [online]. [retrieved on May 7, 2019]. Retrieved from the Internet (URL: https://web.archive.org/web/20110924063844/http://msdn.microsoft.com/en-us/library/windows/apps/hh465370(v=VS.85).aspx), 2019 (Year: 2019).*
"First Office Action and Search Report Issued in Chinese Patent Application No. 201380059086.9", dated May 4, 2017, 22 Pages.
"Final Office Action Issued in U.S. Appl. No. 13/674,238", dated May 18, 2015, 22 Pages.
"Non Final Office Action Issued in U.S. Appl. No. 13/674,238", dated Jan. 15, 2015, 17 Pages.
"Notice of Allowance Issued in U.S. Appl. No. 13/674,238", dated Jan. 11, 2016, 9 Pages.
"International Search Report and Written Opinion Issued in PCT Application No. PCT/US2013/069592", dated Jan. 27, 2014, 10 Pages.
"Office Action Issued in European Application No. 13795395.6", dated Jun. 7, 2018, 9 Pages.
"Second Office Action Issued in Chinese Patent Application No. 201380059086.9", dated Jan. 10, 2018, 4 Pages.

* cited by examiner

A start: select item to move

B move: positioning input

C stop positioning at user-input designated position

D rearrange: move items to accommodate

FIG. 5 stroke's vertical displacement reaches selection threshold; object begins sliding

104A stroke slides object ("on rails") until stroke ends or reaches reposition threshold

104A

A | B
---|---
C | D stroke ends before reposition threshold object snaps back to original position and is selected stroke continues past reposition threshold object moves in correspondence with stroke

A start: stroke vertical/down

B select: continued stroke vertical/down

C start move: further continued stroke vertical/down

D move: stroke continues to move/rearrange selected item

FIG. 9

CROSS SLIDE GESTURE

REFERENCE TO RELATED APPLICATION

This application is a continuation patent application of copending application with Ser. No. 13/674,238, filed Nov. 12, 2012, entitled "CROSS SLIDE GESTURE", which is now allowed. The aforementioned application(s) are hereby incorporated herein by reference.

BACKGROUND

In the field of graphical user interfaces (GUIs), many techniques have been used to scroll or pan items displayed on a display. In addition, it is often convenient to allow a user to move the items and to select items as targets of operations such as deletion, activation, and so forth. For example, many GUI environments include a launch interface or graphical desktop with icons or tiles that can be scrolled together, activated, and rearranged. Typically a different type of input gesture is used for each of these types of interactions with a scrollable surface and its items. That is, there may be different input gestures to scroll, select, and rearrange, respectively. Opportunities to streamline these types of interactions have not previously been appreciated. Increasing use of different types of input devices, in particular touch sensitive displays (displays that also function as two-dimensional digitizers), have introduced opportunities to improve the intuitiveness and usability of scrollable sets of items.

Techniques related to efficiently selecting and rearranging items in a scrollable collection are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Techniques relating to scrolling, object selection, and object moving are discussed. Strokes are inputted by a user, for instance using a touch sensitive surface. Strokes are directed to a scrollable surface with objects therein. Strokes that end before meeting a condition select the objects, and strokes then end after meeting the condition move the objects or representations thereof. The condition may be a distance, although other conditions may be used such as velocity, contact geometry, deltas over time, etc. Selection may only occur when strokes meet a threshold condition such as having a particular direction (e.g., perpendicular to a direction for scrolling the surface) or moving a minimal distance. Strokes in a scrolling direction (e.g., horizontal) may scroll the surface in that direction and strokes in another direction (e.g., vertical) may both select and move the objects. Objects selected may slide on rails before moving.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to allowing a stroke input to either select or move an item displayed in a scrollable surface. Details of scrollable surfaces will be described first. Discussion will then turn to how a progressing stroke's traits can be dynamically monitored to map the stroke, at different stages, to different operations (e.g., selection, movement) will be described next.

Figure 1:
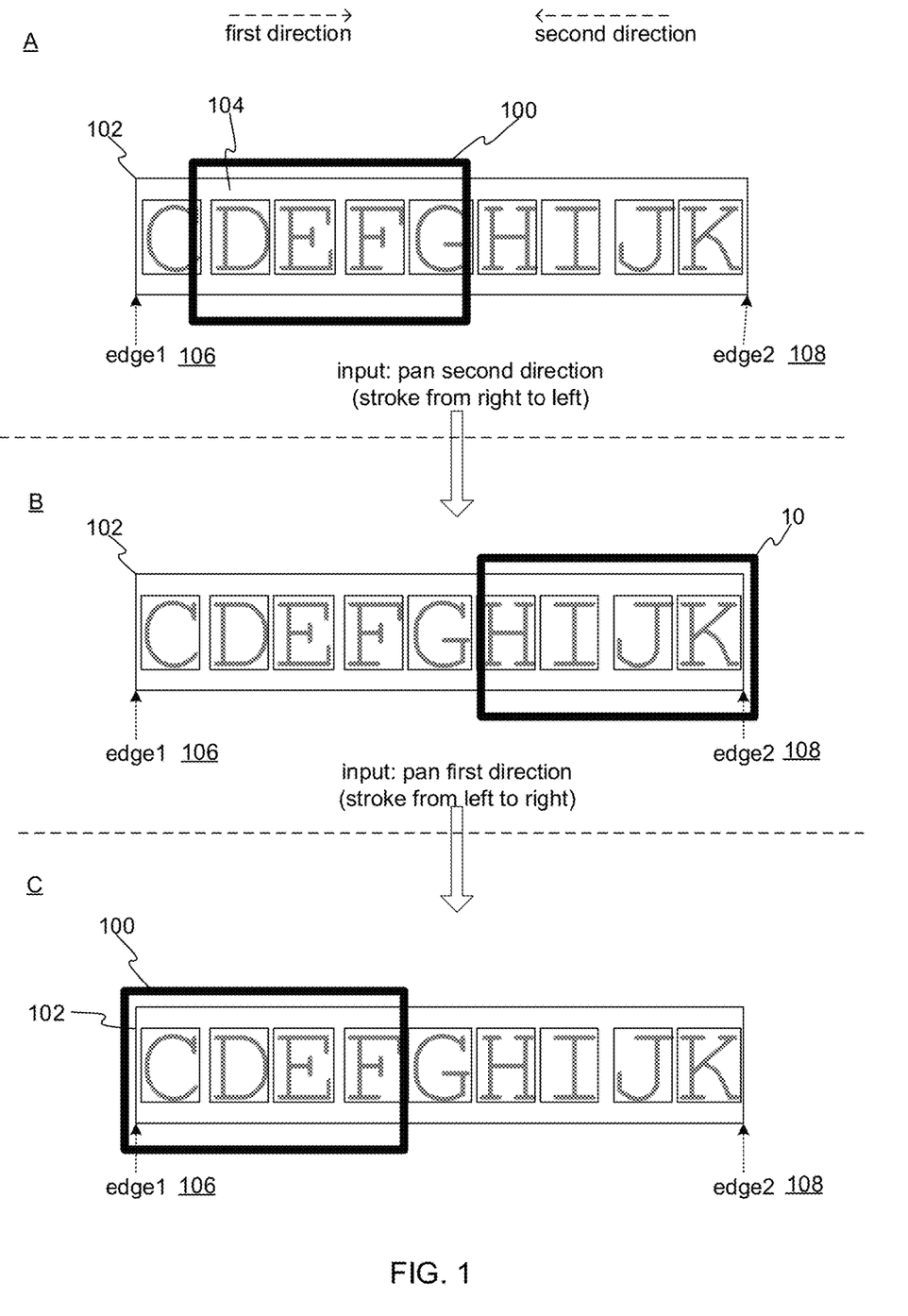
FIG. 1 shows a panning user interface.

FIG. 1 shows a panning user interface. As shown in Frame A, the user interface has a view area 100, and a surface 102 containing items 104. The surface 102 has edges—edge1 106 and edge2 108. The surface 102 may be larger than the view area 100, and a user may pan or scroll the surface 102 to see different of the items 104. Panning may involve displaying a smooth or continuous movement of the surface 102 through the view area 100. There are numerous ways that a user can initiate, control, and terminate a pan of the surface 102. Consider the following examples. A user may drag the surface 102 with a stroke inputted with an input device. The input device might be a mouse, a two-dimensional gesture detection system (e.g., a touch surface), a three-dimensional gesture detection system (e.g., Kinect™, by Microsoft Corp.), a digital pen, or others. Termination of the stroke may cause the surface 102 to glide with inertia to a stop, stop abruptly, or "bounce". A user may continuously activate/deactivate a pan by holding/releasing a physical button, maintaining/ceasing a touch gesture, activating/deactivating a user-interface button, holding/changing a 3D gesture, and so forth. For purposes of discussion herein, a stroke will be considered to be an input that is generated by user-controlled movement. A stroke input may be derived, for example, from a finger or stylus moving on a contact or pressure sensing surface, a mouse moving, a physical object or body part being recognized by a camera, a joystick, or any other system that allows a user to control locations of arbitrary input points or lines in two or three dimensions. A sequence of such input points may be interpolated as a line or may be grouped as a unit based on heuristics such as closeness in time and/or location, etc.

The panning action of the surface 102 may appear to be smooth or continuous (with perhaps some minimal movement delta). The panning action may also vary at the end of a pan. For example, when a pan is ending, the surface 102 may automatically snap to a nearest point such as a marker, a page division, a content feature, etc. Or, the surface 102 may stop abruptly, "bounce" slightly, or gradually glide to a rest. In some cases, the surface 102 may be panned to any arbitrary point of content 104, while in other cases panning stop points may be restricted. In some embodiments, panning may vary in speed according to user input, according to content features or markers that are panned into view, etc.

While examples described herein may show rectangular windows and view areas with rectangular panning surfaces panning from left to right, embodiments described herein may be implemented with different window and surface shapes and with different panning directions. For example, the concepts and embodiments described herein may be used when panning or scrolling horizontally, or even when a surface is larger in all directions than the view area and the surface can be panned in arbitrary directions. In addition, any mention of a window or viewing area may refer to a formally defined sub-region of a display as well as an entire area of a display.

Returning to FIG. 1, a default panning behavior will be described. In frame A of FIG. 1, a user is able to pan the surface 102 in either a first direction (a direction from edge1 106 to edge2 108), or in a second direction (a direction from edge2 108 to edge1 106). When there is user input such as a horizontal stroke that indicates a pan in the second direction, as shown in Frame B, edge2 108 moves toward the view area 100. When edge2 108 reaches (is near, touches, or enters) the view area 100, the default pan behavior is to automatically stop the panning. Frame C shows the position of the surface after panning in the first direction. When a user provides input to pan in the second direction the surface 102 similarly moves to and stops at the view area 100.

Figure 2:
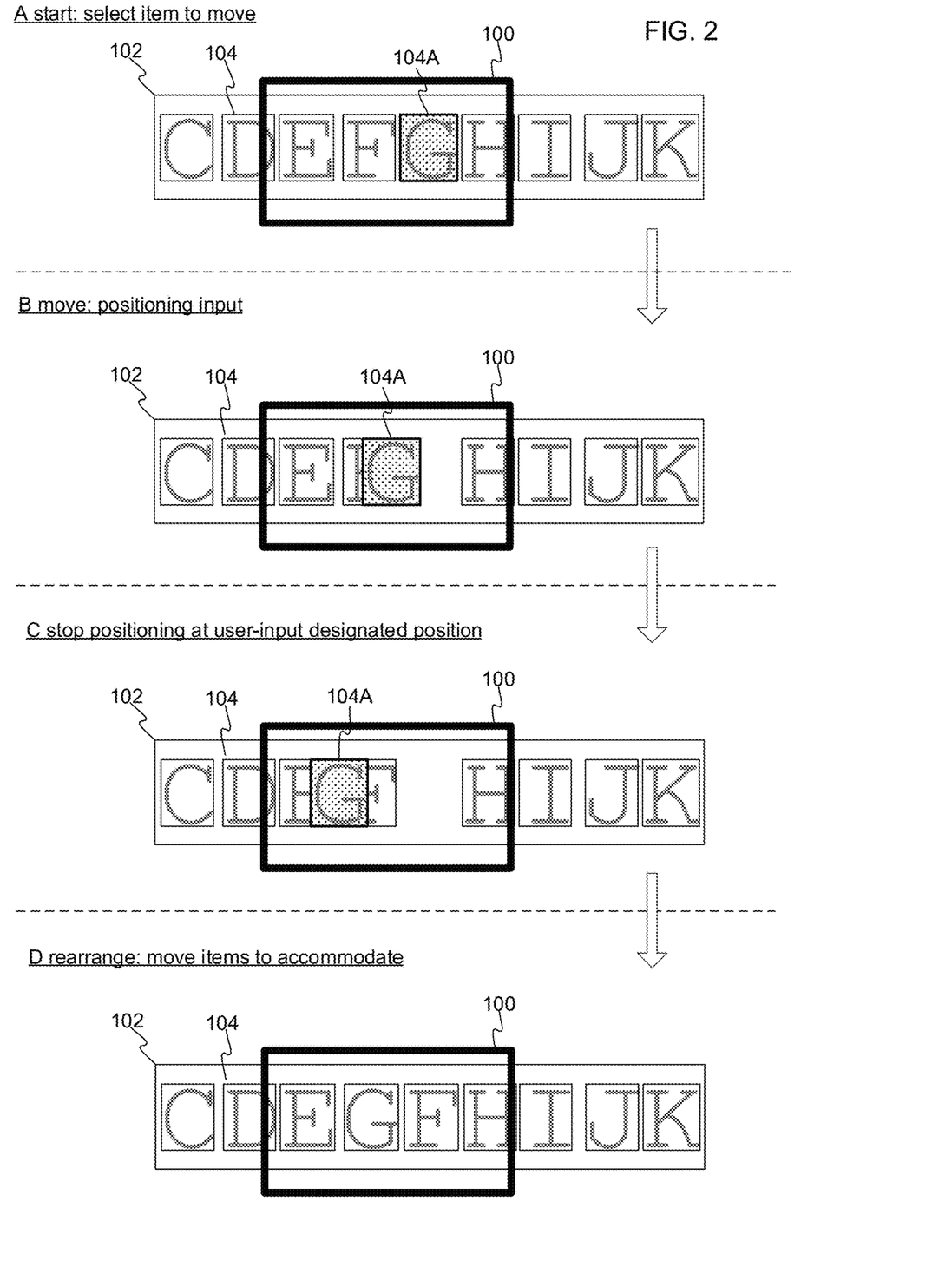
FIG. 2 shows an example of a move operation.

FIG. 2 shows an example of a move operation. At Frame A a target item 104A is selected, for example by a user's stroke, click, or other input. Once selected, as shown at Frame B, the target item 104A is moved by the user relative to the view area 100. In one embodiment, the relative movement may be accomplished by selecting the target item 104A and then scrolling the surface 102 while the target item 104A remains in place relative to the view area 100. At Frame C a user input ends the moving of the target item 104A, and at Frame D the items 104 are rearranged to accommodate the placement of the target item 104A at the slot or position designated by the user. While FIG. 2 shows a tile or icon displayed as moving, a move operation can also be performed with other techniques such as displaying a ghost image of the target item 104A, a cursor, or any other kind of graphic representation. In one embodiment, the surface 102 has defined slots or positions to which items 104 are automatically placed. That is, the surface 102 may have predefined locations (one or two dimensions), coordinates (e.g., rank or order), or regions (e.g., boxes of a grid) to items 104 are constrained. Addition, movement, or deletion of an item 104 may cause items in nearby slots or positions to shift.

Embodiments may vary with regard to subtleties of what is displayed and when. For example, after a cross-slide gesture (a stroke in the select/move direction or against the panning direction) has started, the target item can be immediately popped out of its collection on the surface and the other items are rearranged to close the space the target item formerly occupied. The item is allowed to move freely in two dimensions within the parent container; as it does so, other items may be rearranged around it as it moves.

Figure 3:
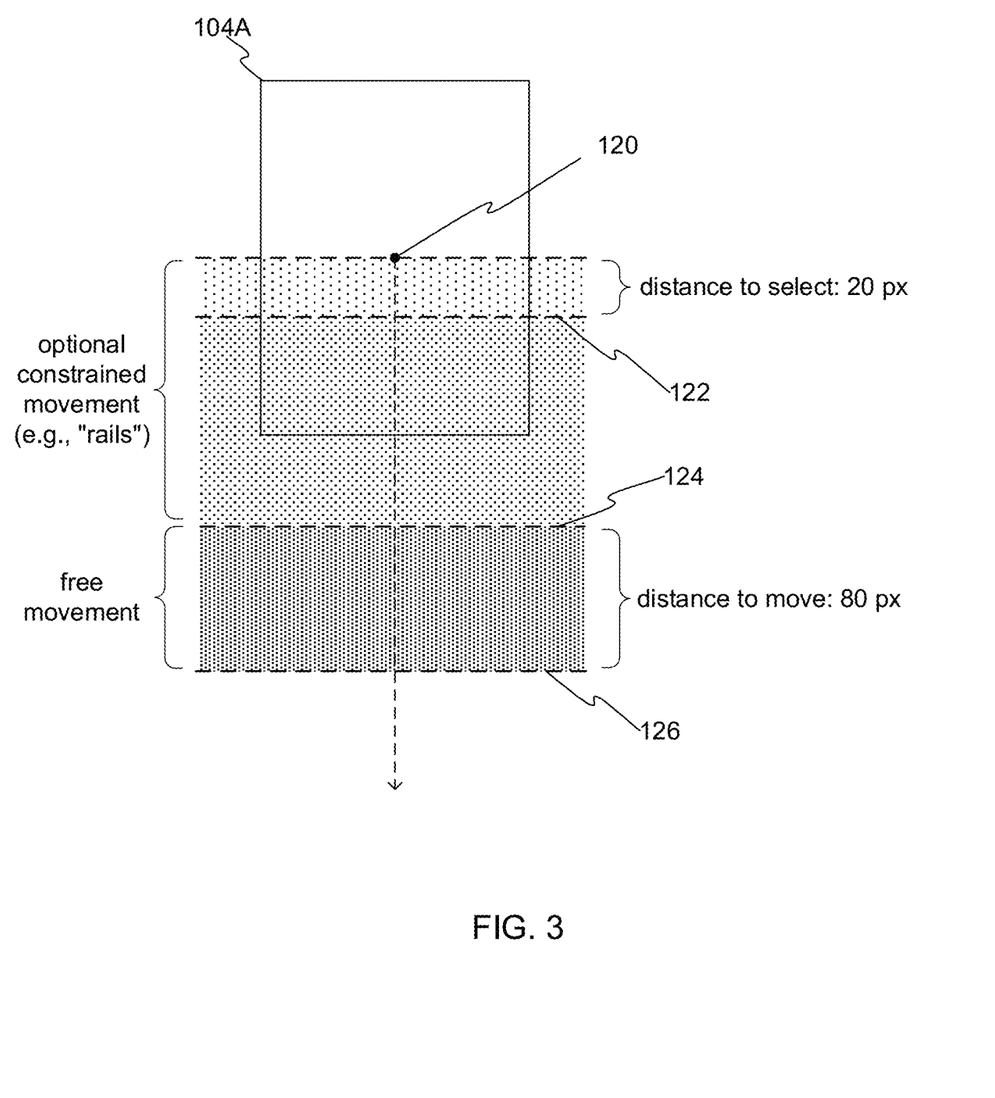
FIG. 3 shows a single-stroke multi-gesture approach to selecting and moving items.

FIG. 3 shows a single-stroke multi-gesture approach to selecting and moving items 104. Initially, a stroke 120 is detected, for example by an application, an operating system, or combination thereof. The target item 104A is identified as a target of the stroke 120 (i.e., is associated with the stroke 120). While the stroke 120 is shown as occurring on the target item 104A (e.g., a touch on a physical surface or a drag of a GUI pointer), the stroke 120 can be associated with the target item 104A in any way, such as by determining that the target item 104A is the closest item 104 to the stroke 120, determining that the stroke is within a given range of the target item 104A, determining that the stroke 120 originated within a boundary associated with the target item 104A, or any other basis for associating an input with an item 104.

When the stroke 120 has reached a threshold selection distance 122 then the target item 104A is deemed to be selected. The term "distance" may refer, for example, to straight-line distance between the beginning and end points of the stroke 120, displacement in a given direction such as vertical or horizontal (e.g., the "x" or "y" magnitude of the stroke 120, path length of the stroke (e.g., cumulative distances between points of the stroke 120), or others. In one embodiment, after the threshold selection distance 122 the target item 104A, or a representative graphic (shadow, cursor, marker, etc.) may move linearly according to the continuing movement of the stroke 120. In another embodiment the stroke 120 merely continues without display of a movement indicator (in yet another embodiment, the target item 104A also slides prior to satisfaction of the selection distance 122 and slides back to its original position of the stroke 120 fails to satisfy the selection distance 122 when it terminates). If the stroke ends between the threshold selection distance 122 and a movement threshold distance 124, then the target item 104A is selected and not moved. The selection may be indicated by graphically distinguishing target item 104A, such as by changing the graphic content of target item 104A (e.g., addition of an "x" or checkmark), by recoloring, flashing, or graying target item 104A, enhancing or adding a border, altering or adding a graphic outside the surface, etc.

If the stroke 120 reaches the movement threshold distance 124 then free-form movement of the target item 104A (or a graphic representation thereof), per movement of the stroke 120, may begin (e.g., the stroke 120 drags the target item 104A or its representation). A release threshold distance 126 may be used. If the stroke 120 ends past the release threshold distance 126 then the target item 104A will be moved according to the location of the end of the stroke 120. If the stroke 120 ends before the release threshold distance 126 then a move of the target item 104A does not occur, which might be indicated by displaying the target item 104A at its original position (or possibly a slightly altered position to indicate that it has been selected), by undisplaying a representation of the target item 104A, etc. When a move of the target item 104A occurs the target item 104A might be relocated to another position or slot in its containing surface. The target item 104A may similarly be copied. Other items 104 might be rearranged to accommodate placement of the target item 104A at a new location or slot. The move may instead cause the target item 104A to be moved or copied out of its containing surface, for instance to another GUI element. The move may alternatively cause the target item 104A to be added or moved to a folder type of item 104.

Figure 4:
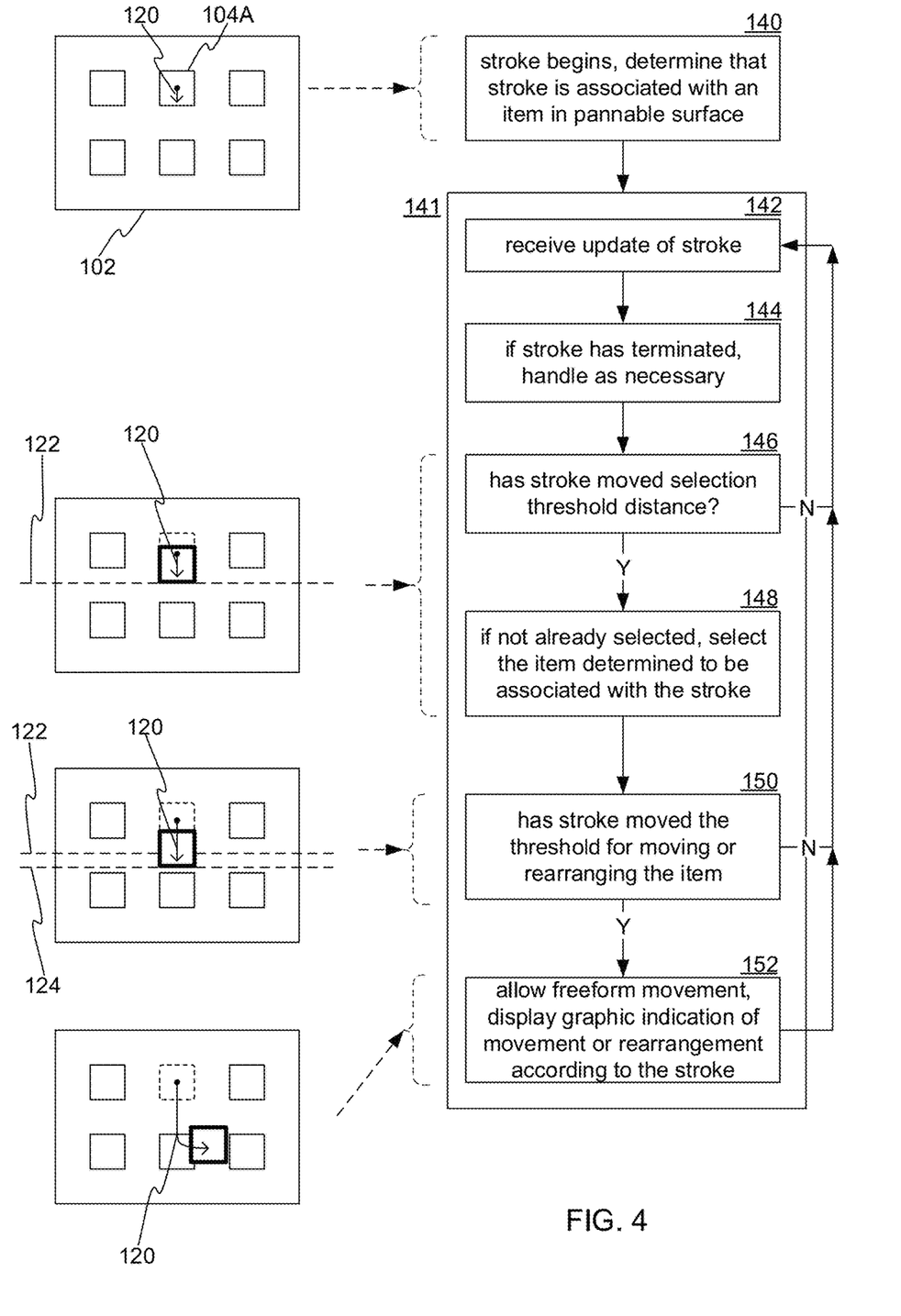
FIG. 4 shows a process using the gesture approach of FIG. 3.

FIG. 4 shows a process using the gesture approach of FIG. 3. At step 140 the stroke 120 begins and it is determined that the stroke 120 is associated with the target item 104A. The process enters a monitoring loop 141 that monitors the stroke 120 to determine which gestures it maps to or which operations it is invoking. At step 142 updates of the stroke 120 are received (e.g., a new contact point or set of points). At step 144 it is determined if the stroke 120 has terminated (e.g., an "up" event), and if so appropriate action is taken, which is described below. Otherwise, the process proceeds to step 146 where it is determined if the stroke has moved or reached the selection threshold distance 122. If the selection threshold distance 122 has not been reached then the loop continues to await a next update of the stroke 120. If the selection threshold distance 122 has been reached then at step 148 the target item 104A is designated as selected or given a state of selected (optionally the target item 104A or its representation may move "on rails" at this stage). At step 150 it is determined if the movement threshold distance 124 has been reached. If it has then at step 152 the target item 104A (or a representation thereof) moves freely in accordance with the stroke 120 (e.g., movement according to movement of a most recent point of the stroke 120). In one embodiment, at step 144, the release threshold distance 126 may be used to determine whether the target item 104A has been moved or whether it instead has only been selected.

Figure 5:
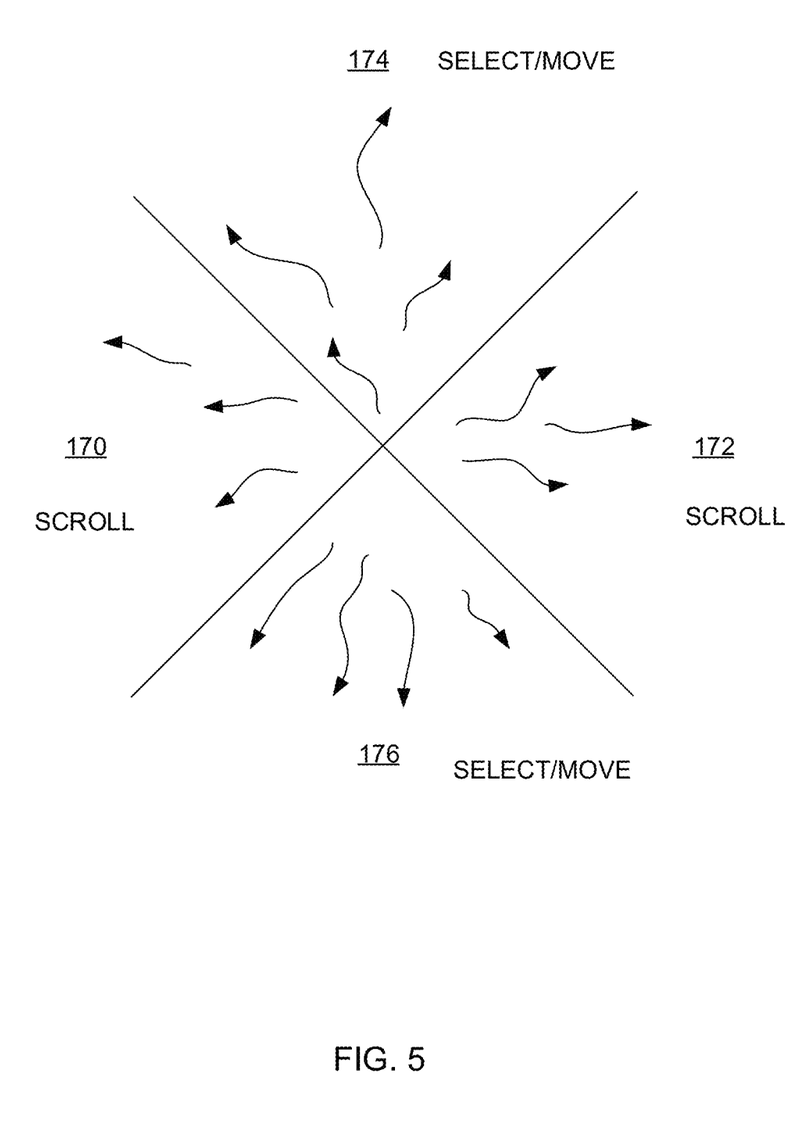
FIG. 5 shows how strokes in different directions can map to different gestures or commands.

FIG. 5 shows how strokes 170, 172, 174, 176 in different directions can map to different gestures or commands for a scrollable surface. Although not shown in FIG. 4, the process thereof may also involve a differentiation between strokes that move substantially in a first direction (e.g., up and down) and strokes that move substantially in a second direction (e.g., left and right). Strokes such as the horizontal strokes 174, 176 in the first direction may be mapped to a scrolling gesture, and strokes such as vertical strokes 170, 172 may be mapped to select/move gestures. In one embodiment, the first and second directions may be substantially perpendicular. For instance, strokes 170, 172 within 45 degrees of vertical are treated as select/move gestures and strokes, and strokes 174, 176 within 45 degrees of horizontal are treated as scrolling gestures that scroll the surface 102. Note that the first and second direction need not be perpendicular, and tolerances other that 45 degrees may be used.

To summarize, an arbitrary stroke is evaluated as it progresses, for instance by a gesture recognition engine. According to the direction of the stroke (e.g., average or interpolated direction, direction near leading point of stroke, vector from start point to most recent point, etc.), the stroke either scrolls or pans the surface 102, or the stroke is evaluated as a potential select or move gesture, as for example in FIG. 4. At one stage the stroke may map to selection gesture, and at another stage the same continuing stroke may map to a movement gesture to allow a movement of a target item. To help identify types of gestures, an initial part of a stroke may be analyzed quickly to determine a direction of the stroke, and then that direction is used to choose either to pan the surface or to select/move a target item.

FIG. 5 shows strokes 170, 172 substantially in one direction that scroll or pan the surface 102 and strokes 174, 176 substantially in another direction that select or move the target item 104A. That is, a process similar to that of FIG. 4 is used, but there is also a step of determining a direction of a stroke relative to the surface 102. If a stroke moves substantially in a first direction (e.g., left or right), then the surface is panned or slid or scrolled by the stroke. If the stroke moves substantially in a second direction (e.g., up or down) then the stroke selects or moves a target item. Note that the directions can have any arbitrary orientation relative to the surface 102.

Figure 6:
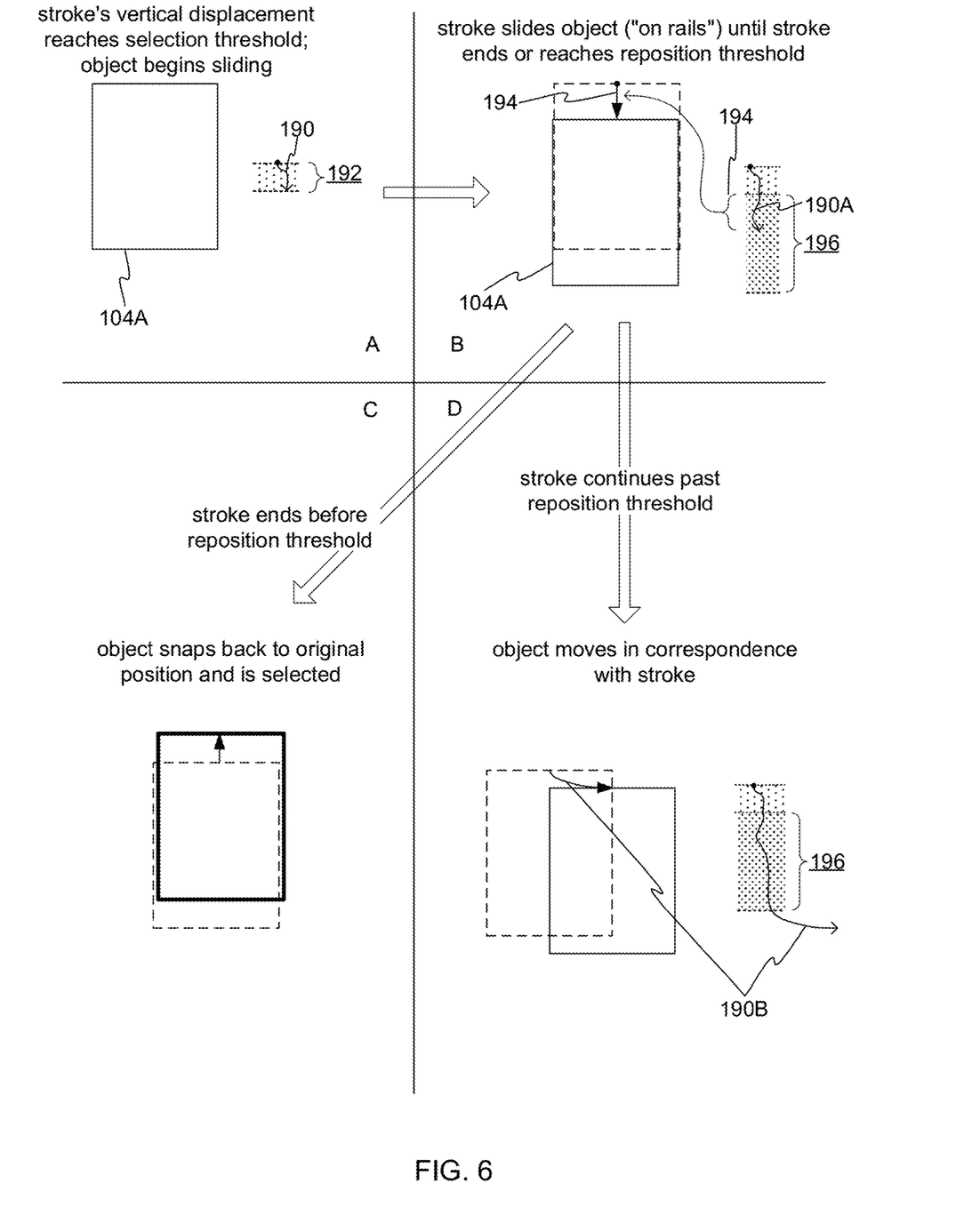
FIG. 6 shows additional detail of how a meandering stroke can select or move the target item.

FIG. 6 shows additional detail of how a meandering stroke 190 can select or move the target item 104A. It is assumed that the direction of the stroke 190 has already been analyzed and the stroke 190 is not a scroll gesture. At Frame A the stroke 190 is evaluated against a threshold directional distance 192. As the stroke 190 passes the threshold directional distance 192 the target item 104A is selected and optionally begins to slide in the select/move direction associated with select/move gestures (e.g., vertical). As shown in Frame B, the stroke 190 has a portion 190A that extends beyond the threshold directional distance 192 and that has a distance 194 moved in the select/move direction; the target item 104A (or its representation) may slide the distance 194. Frame C corresponds to when the stroke 190 ends before the stroke 190 moves a distance (in the select/move direction) that is less than a repositioning threshold distance 196. Frame D corresponds to when the stroke 190 moves a distance (in the select/move direction) that is more than the repositioning threshold distance 196. In Frame D the target item 104A or its representation is removed from the "rails" and begins to move freely according to the continuing progress of the stroke 190 (see second portion 190B of the stroke 190).

Figure 7:
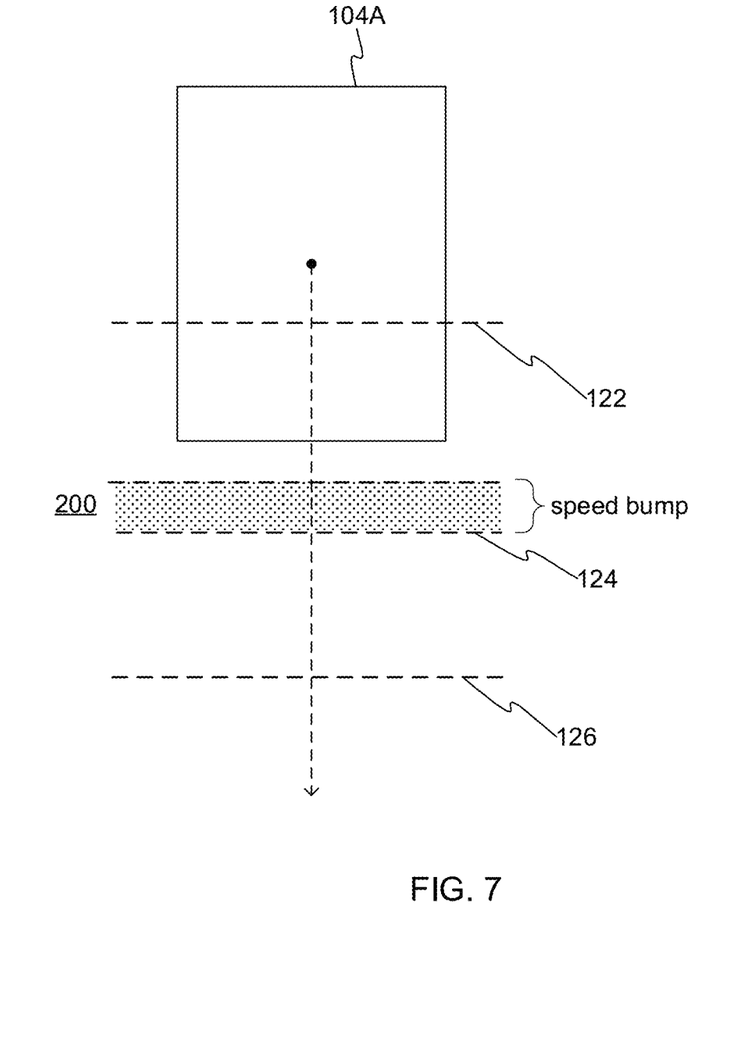
FIG. 7 shows an embodiment that uses a speed bump to slow the speed of dragging the target item or its representation.

FIG. 7 shows an embodiment that uses a speed bump to slow the speed of dragging the target item 104A or its representation. A speed bump is a region where, relative to a rate of movement of the controlling stroke, the rate of movement of the sliding target item 104A or its representation decreases, for instance from a ratio of 1-to-1 to a ratio of 3-to-1 (3 pixels of stroke move the target item 104A or its representation 1 pixel). Such a speed bump 200 may be implemented at or somewhere near the selection threshold distance 124 to provide the user with some feedback that the item is about to transition from selection to movement, and possibly also to provide some delineation between selection mode and movement mode; a user wishing to only select an item will be less likely to drag the item too far and begin moving the item.

Figure 8:
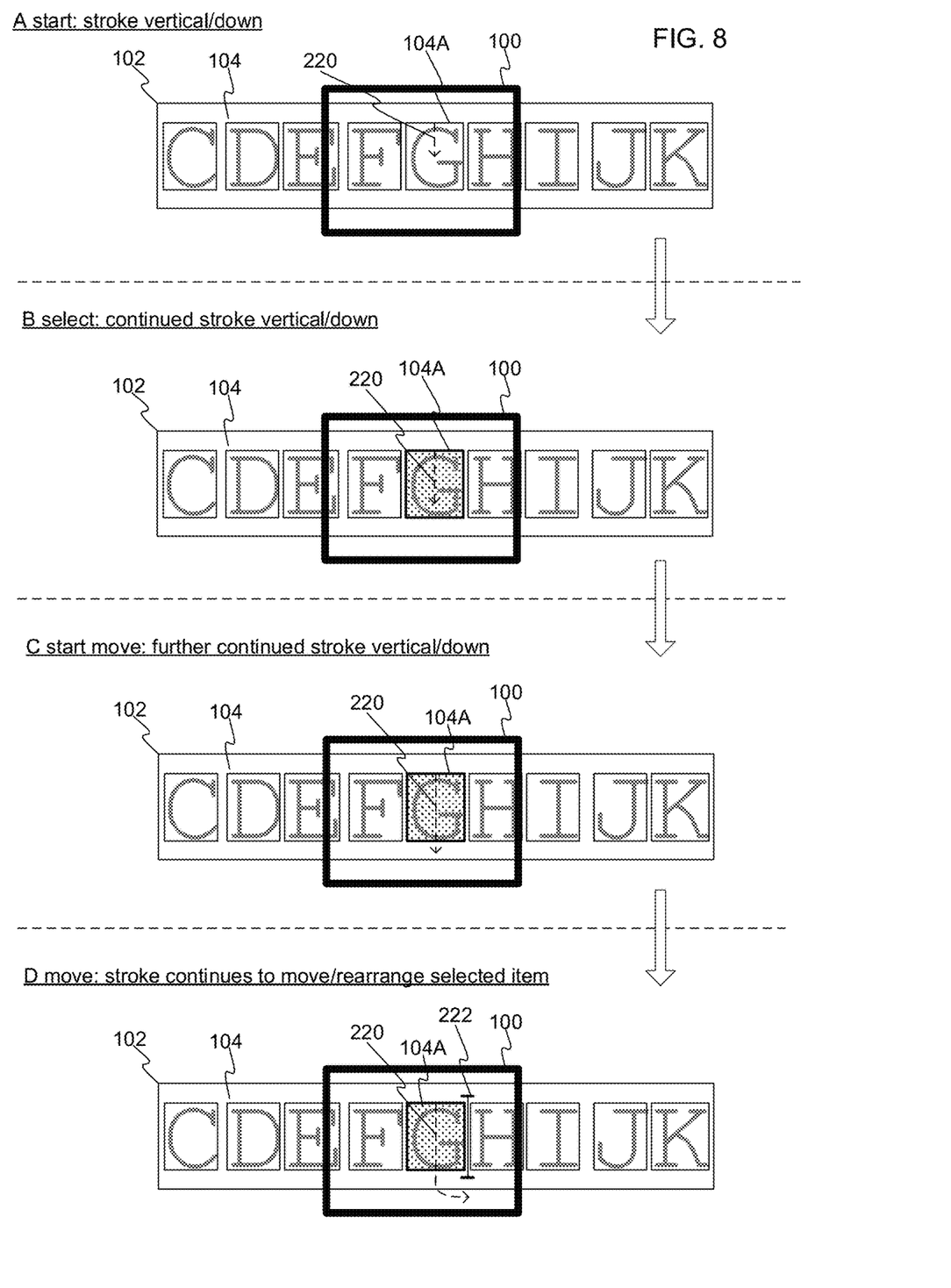
FIG. 8 shows an embodiment where a stroke selects a target item but the target item does not slide.

FIG. 8 shows an embodiment where a stroke 220 selects the target item 104A but the target item 104A does not slide between selection and free movement. At Frame A the stroke 220 starts but has not satisfied a selection condition (e.g., distance moved in select direction. At Frame B the stroke 220 has been determined to satisfy the selection condition and the target item 104A is selected and enhanced to indicate its selection (e.g., by shading, enhanced border of the target item 104A, an animation, addition of a graphic mark, etc.). At Frame C the stroke 220 continues and at Frame D, when the stroke satisfies a move condition (e.g., sufficient distance or possibly a change in direction), a graphic such as a cursor 222 or the target item 104A moves according to the stroke 220. In one embodiment, in particular in the case of a list of items 104 as shown in FIG. 8, the movement of the stroke only moves the graphic in a constrained direction such as in the scrolling direction (in FIG. 8, horizontally).

In another embodiment, the selection condition and the move condition are one and the same. In other words, once an item is selected it immediately is in a mode where it is moved freely (or possibly constrained in the scrolling direction) by the selecting stroke and whether a move actually occurs is determined by conditions found when the stroke ends (e.g., if the stroke ends at or near a valid target).

With regard to specific values for thresholds and conditions, the values may vary according to implementation details such as display size and resolution, input device, developer-set parameters, and so on. In one embodiment, one threshold may be computed from another threshold or both thresholds may be a ratio of a base value.

CONCLUSION

Figure 9:
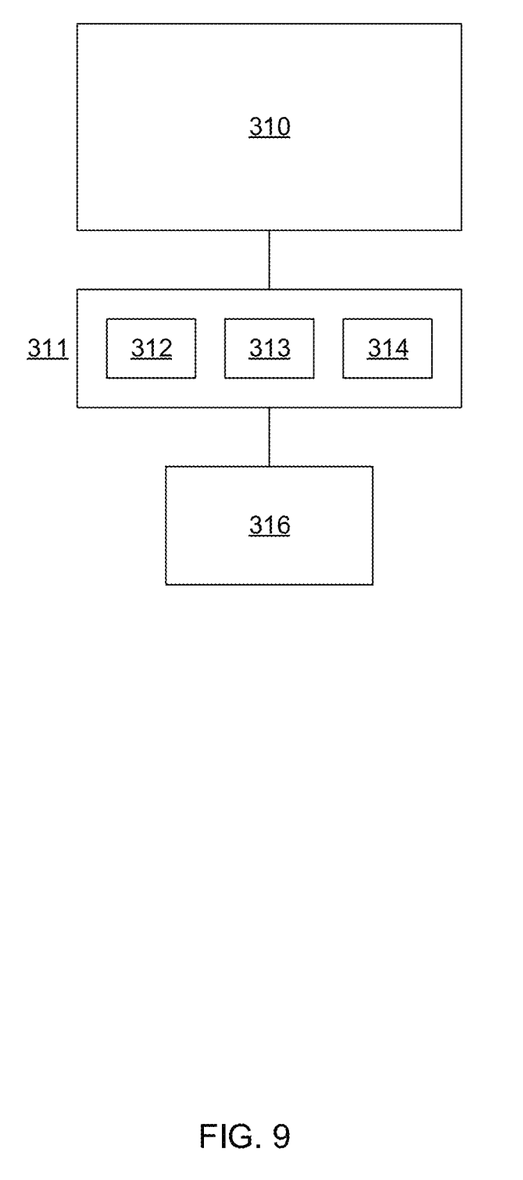
FIG. 9 shows a computing device for implementing embodiments described herein.

FIG. 9 shows a computing device for implementing embodiments described herein. The computing device may have a display 310, a processing component 311 including a processor 312, volatile storage (memory) 313, non-volatile storage 314, and one or more input devices 316. The input devices 316 may be a touch sensitive surface (possibly integrated with display 310), a mouse, a 3D-motion sensor (e.g., a camera), a pressure sensitive tablet surface, and so forth.

Embodiments and features discussed above can be realized in the form of information stored in the storage volatile and/or non-volatile computer or device readable media. This is deemed to include at least media such as optical storage (e.g., compact-disk read-only memory (CD-ROM)), magnetic media, flash read-only memory (ROM), or other means of physically digital information in a physical form (not to be interpreted as including energy or signals per se). The stored information can be in the form of machine executable instructions (e.g., compiled executable binary code), source code, bytecode, or any other information that can be used to enable or configure computing devices to perform the various embodiments discussed above. Again, this is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by a computing device comprising a display displaying an object, processing hardware, an input device, and storage hardware, the method comprising:
controlling translation of the object relative to a displayed scrolling surface and in correspondence with translation of a stroke relative to the scrolling surface, the stroke inputted by the input device, and during the controlling:
at a first stage of the translation, determining that translation of the object has satisfied a first condition corresponding to selection of objects displayed on the scrolling surface, wherein the satisfaction of the first condition causes the object to be selected;
at a second stage of the translation that is after the first stage, based on determining that the translation of the object relative to the scrolling surface has satisfied a second condition, reducing a rate of the translation of the object relative to a rate of translation of the stroke; and
at a third stage of the translation that is after the second stage, based on determining that the translation of the object relative to the scrolling surface has satisfied a third condition, increasing the rate of the translation of the object relative to the rate of translation of the stroke.

2. A method according to claim 1, wherein the first condition comprises translating the object a first distance relative to the scrolling surface, wherein the second condition comprises translating the object a second distance relative to the scrolling surface, and wherein the third condition comprises translating the object a third distance relative to the scrolling surface.

3. A method according to claim 1, wherein the third stage corresponds to a rearranging operation that rearranges the objects on the scrolling surface.

4. A method according to claim 3, wherein a location where the stroke terminates selects a new position for the object according to which the objects are rearranged.

5. A method according to claim 1, wherein during the first stage the translation of the object is constrained to translation in only one direction and during the third stage the stroke controls freeform translation of the object.

6. A method according to claim 1, wherein the object is selected regardless of whether the second and/or third conditions are determined to be satisfied by the stroke.

7. A method according to claim 6, further comprising providing logic that is configured to change the appearance of the object based on the selection of the object.

8. A computing device comprising:
at least one processor;
an input device, the at least one processor configured to monitor strokes while they are input via the input device; and
storage configured to store a surface comprising objects that are each both individually user-selectable and individually user-moveable, and based one of the monitored strokes targeting one of the objects, the at least one processor further configured to:
map the one of the monitored strokes to multiple gestures, such that a first portion of the one of the monitored strokes maps to a first gesture that concurrently selects and moves the object relative to the surface and a second portion of the one of the monitored strokes maps to a second gesture that moves the object relative to the surface in correspondence with movement of the one of the monitored strokes; and
reduce a speed of movement associated with the object relative to the surface in correspondence with a transition from the first gesture to the second gesture, wherein the one of the monitored strokes continues to move the object relative to surface according to the reduced speed.

9. A computing device according to claim 8, wherein the at least one processor is further configured to increase the speed of movement associated with the object relative to the surface as the second gesture begins.

10. A computing device according to claim 8, wherein the input device comprises a touch-sensitive surface, and wherein the at least one processor is further configured to reduce the speed of movement associated with the object relative to the surface by reducing an amount of translation of the object relative to an amount of translation of the stroke.

11. A computing device according to claim 8, wherein the at least one processor further configured to: map a second of the monitored strokes to the first gesture but not the second gesture, wherein the second stroke selects another of the objects but does not reposition the object relative to the other objects.

12. A computing device according to claim 11, wherein the first portion and the second stroke are both mapped to the first gesture based on respective determinations of having translated the respective object and second object a same threshold distance.

13. A computing device according to claim 8, wherein the surface is configured to be scrolled relative to the display in a first direction by strokes substantially in the first direction, and wherein the stroke is determined to be associated with the object based on the stroke moving in a second direction.

14. A computing device according to claim 13, wherein the first direction is substantially perpendicular to the second direction.

15. A computing device according to claim 8, wherein the moving of the object by the second gesture causes reordering of the object relative to the other objects.

16. A computing device comprising:
    at least one processor;
    storage configured to store a surface comprising objects that are each both selectable and reorderable, the objects including first and second objects;
    an input device;
    the at least one processor configured to evaluate strokes inputted via the input device against first and second distances, wherein the first distance is less than the second distance, wherein the evaluated strokes include a first stroke and a second stroke, wherein the first stroke translates the first object relative to the objects and at least the first distance but less than the second distance, wherein the second stroke translates the second object relative to the objects and at least the second distance; and
    the at least one processor further configured to:
        based on the first and second objects translating at least the first distance, select the first and second objects, respectively;
        based on the second object translating at least the second distance, reduce a translation rate of the second object while the second stroke continues to translate the second object relative to the objects; and
        after translation of the second object at the reduced translation rate, increase the translation rate of the second object relative to the objects while the second stroke continues to translate the object relative to the objects.

17. A computing device according to claim 16, wherein the at least one processor is further configured to select the first object without reordering the objects.

18. A computing device according to claim 17, wherein the at least one processor is further configured to continue translation of the second object after increasing the translation rate and then reorder the second object relative to the other objects.

19. A computing device according to claim 18, wherein the at least one processor is further configured to alter appearance of the first object to indicate selection of the first object.

20. A computing device according to claim 16, wherein the at least one processor is further configured to constrain translation of the first and second objects to linear translation at least until the first and second objects have translated the first distance.

* * * * *